Patented June 15, 1937

UNITED STATES PATENT OFFICE 2,083,598

2,083,598

PROCESS FOR THE PREPARATION OF HIGHLY ENZYMATIC YEAST

Ivan Auguste Effront, Seclin, France, assignor to Standard Brands Incorporated, New York, N. Y., a corporation of Delaware No Drawing. Application November 23, 1935, Serial No. 51,267. In France November 23, 1934

9 Claims. (Cl. 195—83)

The invention relates to a process for the production of yeast and more particularly to a procedure in which the enzymic properties and yield are enhanced through the addition of auxiliary pre-fermented masses to the mash or wort undergoing fermentation in a main vat or fermenter.

In the production of yeast, the quality of the finished product depends for the greater part on the way in which propagation is carried out. If the yeast is propagated in an alcoholic medium, as was the case in the old so-called "Viennese" process, a high enzymatic power is developed under natural conditions, and the yeast exerts in the dough a strong action, in the event, that, its nutrition has been suitably controlled. The preparation of yeast according to this precess, however does not pay. Further there is proportionally, a too high production of alcohol, which is difficultly saleable, and a low yield of yeast is obtained. For this reason, in modern processes, in order to avoid the formation of alcohol, it is attempted to effect a suitable concentration by a continuous or periodical addition of the nutritive substance, with, at the same time, a relatively strong aeration. High yields in yeast are, it is true, thus obtained, but the yeast does not have the quality of the so-called "alcoholic yeast". It can be kept for a longer period of time, but, on the other hand, the strength of the yeast is less due to the low enzyme content since no opportunity for formation has been offered.

In actual processes, the operation is started with a certain quantity of seed yeast representing 10 to 25% of the quantity of the raw materials used, which are moreover variable, and in the course of the propagation, a development of generations of cells is attained representing from four to eight times the quantity of yeast initially introduced. Consequently, a yeast is produced having a high degree of development, which, owing to the nutriment introduced is raised to a growth so to speak outside normal conditions (high dilution, addition of air and absence of alcohol).

Processes have however been proposed contemplating a decrease or standardization of the number of generations by separating a portion of the yeast content of the vat, and then after a certain time, pouring back the yeast thus separated into the same vat; in this manner, during the period of separation, the yeast set aside did not participate in the general development in the vat and the number of generations developed in the vat was decreased. This process is complicated and procures but partially the desired result, since the yeast is not placed, as in the process utilizing alcohol, in optimum conditions for the formation of the desired enzymes.

Other methods are known in which the seed yeast is proportioned upon each separate addition. In this case also, the propagation of each of the portions thus added occurs only in the main high dilution vat and under identical conditions during the entire period, as those for the total mass of the solution in course of fermentation. Sometimes, when preparing the seed yeast, mash already separately fermented is introduced only at the beginning in the vat. In this case, molasses or nutritive materials not yet fermented are poured into the vat, and this, usually, at the same time as water, but without wort already fermented or in course of fermentation being subsequently introduced.

The object of the present invention is to cultivate yeast in such conditions that, in presence of alcohol, enzymes are formed in the cells and that, on the other hand, the yield remains satisfactory.

According to the invention, to a main mass in course of fermentation comprising a carbohydrate material capable of undergoing alcoholic fermentation (sugars or starchy material), seed yeast and nutritive materials, such as ammonium phosphate, ammonium sulfate, peptones or other organic nitrogen, the whole highly diluted in water, are added, at intervals of a few hours, auxiliary masses composed of the same substances, but much less diluted and having already partially fermented during a few hours, whereupon the total mass is left to ferment further during a few hours and the yeast formed is collected. The auxiliary masses are moderately aerated during their fermentation and the main mass is aerated in a more and more active manner in proportion as the auxiliary masses are added. Moreover, all the fermentable materials, the nutritive materials and the yeast are introduced in each mass exclusively at the beginning of the fermentations, except eventually a portion of the nitrogen containing nutritive substances may be added to each auxiliary mass at the time the latter is added to the main mass.

The several masses which have been subjected to alcoholic fermentation independently from each other, are therefore united into a single fermentation mass. Accordingly these fermentations, first carried out separately, are, after a certain time, continued in the main vat without subsequently adding other nutritive materials thereto, consequently they begin in a concentrated medium, and terminate in a dilute medium.

The present process is somewhat similar to the process known under the name of "Abstellverfahren", in which a portion of the fermentable materials with all the nutritive salts and all the mother-yeast necessary are made up in one batch and introduced into one or more auxiliary fermentation vats without any pouring together being effected, but it distinguishes therefrom by the facts that several partial fermentations are introduced into a single main fermentation, and that each of these partial fermentations is highly concentrated. The auxiliary masses which have been subjected to these partial fermentations are introduced, after a certain time during which they will have been slightly aerated, into the main fermentation mass, the dilution and aeration of which are greater.

The ripening of the partially fermented masses then proceeds normally, without addition of sugar or of nutritive materials. Consequently, this process departs from the principle of additions according to which nutritive substances are periodically or continuously added in the course of the fermentation according to its rate and the formation of fresh yeast.

Alcoholic fermentation of the auxiliary masses does not cause the formation of enzymes in the yeast cells, and as the nutritive substances have been introduced in sufficient quantity from the beginning, the multiplication of the cells takes place in the main vat with a satisfactory yield without weakening of the enzymes. By varying the quantities of the auxiliary masses partially fermented and still fresh which are added to the main mass, and by also varying the dilution of the masses and the quantity of air injected in the main mass, the qualities of the final product can be modified at will, within wide limits.

When the partial fermentation has been controlled and the moment the auxiliary masses are to be added to the main mass has been accurately determined, the process can be rendered continuous by removing, at the suitable moment, from the main mass, a portion of this mass, from which yeast will be separated, and by replacing it by an equal amount of an auxiliary mass which has just been subjected to a partial alcoholic fermentation.

The liquid removed from the main vat must contain a quantity of carbohydrate materials equal to that which has been used in the partial fermentation mass which will be added. In order that the total dilution in the main vat should remain the same, the necessary quantity of water will be added to the auxiliary fermentation mass, just before it is introduced into the main vat, in order that its volume shall become the same as the volume removed.

The process also permits choice of nutriment. It has been found that it is very advantageous to nourish yeast during partial fermentation only with organic nitrogen (peptones) and, in order to obtain the required yield, to add to the auxiliary masses the remainder of the nitrogen necessary in an inorganic form before adding them to the main mass. But, satisfactory results are also obtained by utilizing in the partial fermentations a mixture of organic nitrogen and inorganic nitrogen and by eventually completing the nitrogen nourishment by adding the complement to the auxiliary masses before adding them to the main mass.

An example of industrial application of said process will be described, and it is to be understood that the concentration and the intervals of time mentioned are indicated simply by way of example and can be modified.

1,000 kgs. of molasses (or equivalent sugar or starch containing materials) are prepared according to the usual methods, that is to say if molasses is under consideration, clarified by cooking and decantation or centrifugation or filtration; and if amylaceous materials are used, they will be previously saccharified and filtered. 250 kgs. of these fermentable materials may be introduced into the main vat with the necessary nutritive materials. Thus molasses will be suitably diluted to 1/50th, which will give about 125 hectolitres and a proportional quantity of "seed yeast", from 10 to 20%, that is to say from 25 to 50 kgs., will be added. The contents will subsequently be moderately aerated; for instance, if a vat of average size is being utilized, from 50 to 300 cubic meters of air will be used per hour.

At the same time, in a smaller vat (auxiliary vat) a partial fermentation mass is prepared with about 250 kgs. of molasses. To this molasses (or the equivalent in other fermentable carbohydrate materials) are also added any necessary nutritive materials, and the same proportion of seed yeast as above. However, for this fermentation, the concentration is much higher inasmuch as the molasses is for instance diluted to 1/10th, thus forming a total volume of about 25 hectolitres in the auxiliary vat.

Further, for this auxiliary fermentation and for the other auxiliary fermentations, it is permissible to introduce at the beginning only a portion of the nitrogen nutriment, about one half, and this in an organic form; the second half is added upon pouring this mass in course of fermentation into the main fermentation vat.

Furthermore, for the auxiliary fermentations, as mentioned above, it is possible to use at the beginning a mixture of organic and inorganic nitrogen, then to add the remainder of the nitrogen still necessary, either in an organic form or in an inorganic form, or in the form of a mixture of both, to the auxiliary mass before adding the latter to the main mass.

After a certain period of fermentation, about 3 hours, the auxiliary mass is poured into the main vat and, at the same moment, the injection of air is increased, for instance by utilizing from 500 to 1,000 cubic meters of air per hour (instead of from 50 to 300). At the same time, a second partial fermentation, similar to the preceding one, is begun in an auxiliary vat with 250 kgs. of molasses (or the equivalent in other carbohydrate materials), diluted to say a total volume of about 25 hectolitres. Three hours thereafter, this mass in course of fermentation is poured into the main vat and the rate of aeration increased. The same operation is repeated with the remaining 250 kgs. of molasses and injection of air is further increased after this third auxiliary mass has been added to the main mass. Three hours thereafter, the yeast is "ripe" and can be collected according to the usual processes, that is to say separated by centrifugation.

Further additions of auxiliary masses in course of fermentation can also be effected every 3 hours, as above, in the main vat. The pre-fermentation period in the auxiliary vat, before addition to the main mass, depends on the volume of air employed, on the concentration and on the percentage of "seed yeast".

The following general rule can be adopted: the saccharometric degree of each auxiliary mass in course of fermentation must not fall much below one half of the initial saccharometric degree before it is added to the main mass.

If it is desired to obtain a continuous operation, auxiliary masses in course of fermentation will be continuously added to the main mass, but, before each of these additions, from this main mass will be taken a volume equal to that of the auxiliary mass and the yeast produced will be separated therefrom. In the above example it will thus be necessary to remove 50 hectolitres of wort from the main vat, and to add to the 25 rectolitres of the auxiliary fermentation, 25 hectolitres of water, at the time of introduction into the main vat.

A higher yield may be obtained by starting with a main mass of smaller concentration, that is to say the dilution of which can be as low as 1/100th. The auxiliary fermentation will also take place in a less concentrated medium.

If it is desired to prepare a yeast having a satisfactory enzymatic power, while preserving a high yield, the number of additions of auxiliary masses to the main mass will be increased, and the fermentation of these auxiliary masses will be carried out to a lesser degree before they are added to the main mass.

With the present process, it is possible to obtain a satisfactory yield of yeast with a small number of generations, giving consequently stronger generations and, owing to the auxiliary alcoholic pre-fermentation, a yeast is produced having greater strength and the biological qualities of yeast cultivated in an alcoholic medium.

Another advantage of the process resides in the fact that during the pre-fermentations or culturing of the yeast, the presence of alcohol avoids the risk of infections.

I claim:

1. A process for the production of highly enzymatic yeast which comprises preparing a highly dilute main mass or wort containing a yeast fermentable carbohydrate material and yeast nutrients, innoculating the wort with seed yeast and propagating yeast therein with fermentation under aeration, preparing an auxiliary mass or wort containing carbohydrate, nutrient and yeast as in the main wort and in a concentration greater than that in the main wort, effecting a partial propagation and fermentation in the auxiliary wort with aeration, then adding the auxiliary partially fermented wort to the main wort during the propagation, continuing propagation of yeast in the main wort at a rate of aeration greater than that utilized initially, and finally separating yeast from the wort.

2. A process for the production of highly enzymatic yeast which comprises preparing a highly dilute main mass or wort containing a yeast fermentable carbohydrate material and yeast nutrients, innoculating the wort with seed yeast and propagating yeast therein with fermentation under aeration, preparing a plurality of auxiliary worts containing yeast fermentable carbohydrate and nutrient materials in a concentration greater than that in the main wort, innoculating with seed yeast and effecting a partial fermentation thereof with aeration, adding the auxiliary partially fermented worts to the main wort at intervals during the propagation and fermentation therein, continuing the propagation and fermentation subsequent to the addition of auxiliary wort with a rate of aeration greater than that utilized initially and, finally separating yeast from wort.

3. A process for the production of highly enzymatic yeast, as described in claim 1, which is characterized in that the amount of seed yeast added to the wort is about 10 to 20% of the carbohydrate material utilized, and in which the auxiliary wort is added to the main wort after a period of about three hours.

4. A process for the production of highly enzymatic yeast according to the process described in claim 2 which is characterized in that the amount of seed yeast utilized is from 10 to 20% of the carbohydrate material, and in which the auxiliary worts are added to the main wort at intervals of about three hours.

5. A process for the production of highly enzymatic yeast according to the process described in claim 2 which is characterized in that an amount of wort is removed from the main wort after the addition of an auxiliary wort and prior to the introduction into the main wort of a succeeding auxiliary wort and yeast separated from the thus removed wort.

6. A process for the production of highly enzymatic yeast according to the process described in claim 2 which is characterized in that an amount of wort is removed from the main wort after the addition of an auxiliary wort and prior to the introduction into the main wort of a succeeding auxiliary wort, the amount of wort removed being substantially equal in volume to the amount of auxiliary wort to be added.

7. A process for the production of a highly enzymatic yeast according to the process of claim 1 which is characterized in that the auxiliary wort contains at the initiation of fermentation therein a portion only of the nutrient materials required for development of the yeast, and in which the remainder of the nutrient materials is introduced just prior to the addition of the auxiliary wort to the main wort.

8. A process for the production of a highly enzymatic yeast according to the process claimed and described in claim 1 which is characterized in that the auxiliary wort contains at the initiation of fermentation therein a portion only of the nutrient materials including organic nitrogen, and in which the remainder of the nutrient materials are introduced in the form of organic nitrogen and inorganic nitrogen just prior to the addition of the auxiliary wort to the main wort.

9. A process for the production of highly enzymatic yeast which comprises preparing a dilute main mass or wort containing a yeast fermentable carbohydrate material and yeast nutrients, innoculating the wort with seed yeast and propagating yeast therein with fermentation under aeration, preparing an auxiliary mass or wort containing carbohydrate, nutrient and yeast as in the main wort and in a concentration greater than that in the main wort, effecting a partial propagation and fermentation in the auxiliary wort with aeration, removing a quantity of liquid from the main wort, separating yeast from said liquid, then adding the auxiliary partially fermented wort to the main wort with continued propagation of yeast therein at a rate of aeration greater than that utilized initially, effecting successive propagation with fermentation of yeast in auxiliary worts like unto that aforementioned with introduction thereof after partial fermentation into the main wort, and with removal from the main wort of a quantity of liquid after addition of an auxiliary wort and just prior to the introduction of a successive auxiliary wort, said removed liquid having the yeast separated therefrom, and repeating in the foregoing manner the propagation with fermentation in auxiliary worts, removal of liquid from the main wort and separation of yeast therefrom, and introduction of partially fermented auxiliary worts into the main wort, all in such a manner whereby the preparation of the highly enzymatic yeast is rendered substantially continuous.

IVAN AUGUSTE EFFRONT.